United States Patent [19]

Ramalingam et al.

[11] Patent Number: 4,927,300
[45] Date of Patent: May 22, 1990

[54] INTELLIGENT INSERT WITH INTEGRAL SENSOR

[75] Inventors: Subbiah Ramalingam, Roseville; Darrell A. Frohrib, St. Paul, both of Minn.

[73] Assignee: Regents of the University of Minnesota, Minneapolis, Minn.

[21] Appl. No.: 248,298

[22] Filed: Sep. 21, 1988

Related U.S. Application Data

[63] Continuation of Ser. No. 35,038, Apr. 6, 1987, abandoned.

[51] Int. Cl.$^5$ .............................................. B23B 27/00
[52] U.S. Cl. .................................. 407/120; 73/862.06
[58] Field of Search ............... 407/119, 120, 113, 114, 407/115, 116, 11; 82/1.11, 118, 120, 173, 905; 72/2, 5, 19; 73/78, 104, 862.06, DIG. 4; 408/134, 182, 194; 74/DIG. 7; 310/338

[56] References Cited

U.S. PATENT DOCUMENTS

| | | | |
|---|---|---|---|
| 2,360,639 | 10/1944 | Asimow | 73/104 |
| 2,457,960 | 1/1949 | Walker | 255/61 |
| 3,889,520 | 6/1975 | Stöferle | 82/2 B |
| 3,948,089 | 4/1976 | Shaw et al. | 73/DIG. 4 |
| 3,969,927 | 7/1976 | Yoshida et al. | 73/DIG. 4 |
| 4,076,442 | 2/1978 | Cox, Jr. et al. | 408/8 |
| 4,471,444 | 9/1985 | Yee | 73/104 |
| 4,559,600 | 12/1985 | Rao | 408/8 |
| 4,593,277 | 6/1986 | Langan | 73/104 |
| 4,671,147 | 6/1987 | Komanduri | 82/2 B |
| 4,744,241 | 5/1988 | Mayer | 407/113 |
| 4,759,243 | 7/1988 | Thompson | 82/2 B |

FOREIGN PATENT DOCUMENTS

| | | |
|---|---|---|
| 0203490 | 12/1986 | European Pat. Off. |
| 2220237 | 11/1972 | Fed. Rep. of Germany . |
| 2906892 | 9/1980 | Fed. Rep. of Germany . |
| 3535473 | 4/1987 | Fed. Rep. of Germany . |
| 2464764 | 3/1981 | France . |
| 0048558 | 4/1980 | Japan .................................. 82/2 B |
| 1234049 | 5/1986 | U.S.S.R. ............................. 82/2 B |

OTHER PUBLICATIONS

Patent Abstracts of Japan, vol. 9, No. 14 (M-352)(1737), Jan. 22, 1985, & JP, A, No. 59163014 (Sumitomo Denki Kogyo K.K.) Sep. 14, 1984.
Patent Abstracts of Japan, vol. 11, No. 71 (M-567) (2518), Mar. 4, 1987, & JP, A, No. 61228120 (Koyo Seiko Co. Ltd.) Oct. 11, 1986.
Patent Abstracts of Japan, vol. 7, No. 30 (P-173) (1175), Feb. 5, 1983, & JP, A, No. 57182161 (Matsushita Denko K.K.) Nov. 9, 1982.
Uehara, K., "Identification of Chip Formation Mechanism Through Acoustic Emission Measurements", *Annals of the CIRP*, vol. 33, pp. 71-75, Jan. 1984.
Tlusty, J. et al., "A Critical Review of Sensors for Unmanned Machining", *Annals of the CIRP*, vol. 32, pp. 563-573, Feb. 1983.
Lindberg, B. et al., "Measurements of the Segmentation Frequency in the Chip Formation Process", *Annals of the CIRP*, vol. 32, pp. 17-21, Jan. 1983.

*Primary Examiner*—Frederick R. Schmidt
*Assistant Examiner*—Blynn Shideler
*Attorney, Agent, or Firm*—Kinney & Lange

[57] ABSTRACT

A high speed steel, carbide or ceramic cutting insert or tool carrying an integrally mounted sensor to permit the sensor to sense and monitor machining phenomena on the cutting insert on a continuous basis to determine whether the cutting insert is operating efficiently and effectively.

10 Claims, 5 Drawing Sheets

INTELLIGENT INSERT WITH INTEGRAL SENSOR

This is a continuation of application Ser. No. 035,038, filed Apr. 6, 1987 (now abandoned).

BACKGROUND OF THE INVENTION

1. Field of the Invention

The present invention relates to a cutting tool or insert that has an integrally mounted sensor to produce a signal indicating tool condition and operation parameters.

2. Description of the Prior Art

Unmanned machining centers are rapidly being developed for factory use, and at present numerical control machines of various types are inherently compatible with unmanned manufacture. Automatic material inspection systems have been advanced as well, but a principal difficulty in realization of automated, unattended operation on an around the clock basis is the lack of effective and reliable sensors to monitor the unmanned machining centers production systems under computer control. Accurate sensing of the condition of the cutting tool is critical to operation and so far has been unattainable. Sensing so that if the tool breaks or cracks, it is immediately noted is important. Also, if it wears beyond acceptable limits, or otherwise deviates from desired parameters, a signal is needed to give an indication so that change of tools can be accomplished quickly. Worn tools, dull tools, or fractured tools result in manufacture of products outside specifications, and also they may damage the part that is being made or cause damage to the machine tool itself, which invariably leads to increased manufacturing costs and loss of manufacturing capacity. Thus, one important feature of the present invention is to prevent such losses and ensure satisfactory operation of unmanned machining centers.

In the prior art, adaptive control systems have been advanced which monitor a manufacturing process as it is being performed in machining systems so that the processing conditions can be changed in order to make the machine more productive. Adaptive control systems which operate by sensing machine spindle drive motor current are already commercially available. There are some force sensing and feedback control systems also on the market, but generally speaking they are not regarded as satisfactory as shown in the prior art references cited below. Thus, the present invention also is designed to fill the existing need for an adaptive control that is accurate, reliable, and "on-line."

Where the monitored machine is in a production line, failure to sense damage to a single tool can cause losses that are much greater than in individual machining centers, because an entire line may be affected. Therefore, the present invention will find wide acceptance in these types of operations, as well.

In the prior art, studies have been made on the dynamics of formation of chips during machining, and various methods have been arrived at for measuring machining forces.

For example, in an article entitled "A Critical Review of Sensors for Unmanned Machining," by Tlusty, D.J., and Andrews, G.C. (Annals of the C.I.R.P., 32-2, 1983), several different types of sensors are examined on the basis of operating reliability for unmanned machining. This article states that the crucial problem that must be overcome in order to achieve the full potential of unmanned machining centers is the development of reliable and effective sensors for monitoring machine operation, for ensuring efficient metal removal rates, and for taking corrective action in the event of accidents or breakages. The article provides a survey of the then available sensors, all of which have serious limitations insofar as reliability and direct response, particularly because of mechanical filtering of signals on the tool through interfaces of the tool and tool support.

A typical dynamometer sensor that mounts a cutting tool is described in an article entitled "Identification of Chip Formation Mechanism Through Acoustic Emission Measurements," by Kunio Uehara and Yuichi Kanda (Annals of C.I.R.P, 33-1, 1984). The dynamometer or platform for mounting the tool holder is satisfactory to sense equilibrium phenomena, such as average cutting forces, using DC level measurements. However, the AC components or the high frequency forces are filtered away by the interfaces between the cutting tool or insert and its tool holder, the tool holder and the dynamometer, and by the dynamics of the instrumentation system itself. As a consequence, dynamometers are unable to sense phenomena occurring at much over 1 kHz.

The mounting of an accelerometer onto a tool holder and using the assembly in connection with a force sensor is described in an article entitled "Measurements of the Segmentation Frequency in the Chip Formation Process," by B. Lindberg and B. Lindstrom (Annals of C.I.R.P., 33-1, 1983). While accelerometers can sense very high frequencies, the ability to sense phenomena occurring at the tool cutting edge at much over 5-10 kHZ is limited because the cutting tools or inserts are clamped mechanically in the pocket of a tool holder and the transmissibility of signals across the tool holder and insert interface is low. Thus, high frequency phenomena occurring right at the cutting edge of the tool are not efficiently communicated to the tool holders, and accelerometers installed on the tool holders are therefore unable to sense high frequency forces or vibrations experienced by the cutting tool or insert.

Under normal commercial cutting conditions, the crystalline grain passing frequency at the cutting edge is in the MHZ range. The crystalline grain passing frequency and other dynamic phenomena such as chip segmentation and the like act substantially as background noise generators. The dynamic behavior of the cutting system reflects this noise generation, and as a result it oscillates with modes and frequencies compatible with its structure and the impressed excitation frequencies. Motion of the tool holder and the tool post will result in the work piece having waviness components on its surface finish that follows this motion. In existing systems using existing sensors, these motions are filtered and cannot be sensed either for process monitoring or for process control.

SUMMARY OF THE INVENTION

The present invention relates to a cutting insert or cutting tool that carries sensors directly on the tool to provide a signal indicating vibrations and forces acting on the insert, without any filtering. The insert is standard size and shape, but includes means mounting a sensor on its body, within its periphery, that will respond to vibrations and provide for high frequency sensing to ensure that all pertinent vibrations and forces are determined.

In various forms of the invention, the insert is directly used to mount accelerometers, or preferably, piezo-sensitive, that is, piezo-electric, or piezo-resistive sensors as well as other force temperature, acceleration, acoustic emission sensors. These sensors are for sensing cutting tool phenomenon such as forces, temperature, vibration and the like.

In one form of the invention, a film of piezo-electric material is bonded to or integrally formed as part of the material from which the insert is made, or a piezo-electric or piezo-resistive material can be deposited on the cutting tool exterior surfaces directly. Pressure sensitive contacts can be applied to the cutting insert and to the piezo-electric or piezo-resistive (piezo-sensitive) film for taking off the signals generated.

The cutting tools can include sensors with relatively little cost increase, particularly if deposited piezo-electric, piezo-sensitive or thermo-sensitive materials are used. Since most of the carbide cutting tools or inserts presently sold are already coated, additional coatings may be needed in order to provide a necessary layering for piezo-electric sensing, but sequential deposition of material onto the cutting tools can easily be done. For example, silk screen printing and thick film technology can be used.

Circuitry for amplifying the low level signals can be carried in the interior of the tool holder for first stage amplification or on rotating cutting heads. The head is provided with suitable means for transmitting the signal from the insert to external circuitry, for example, optical couplers, slip rings or radio frequency transmitting circuits.

DETAILED DESCRIPTION OF THE PREFERRED EMBODIMENTS

Figure 1:
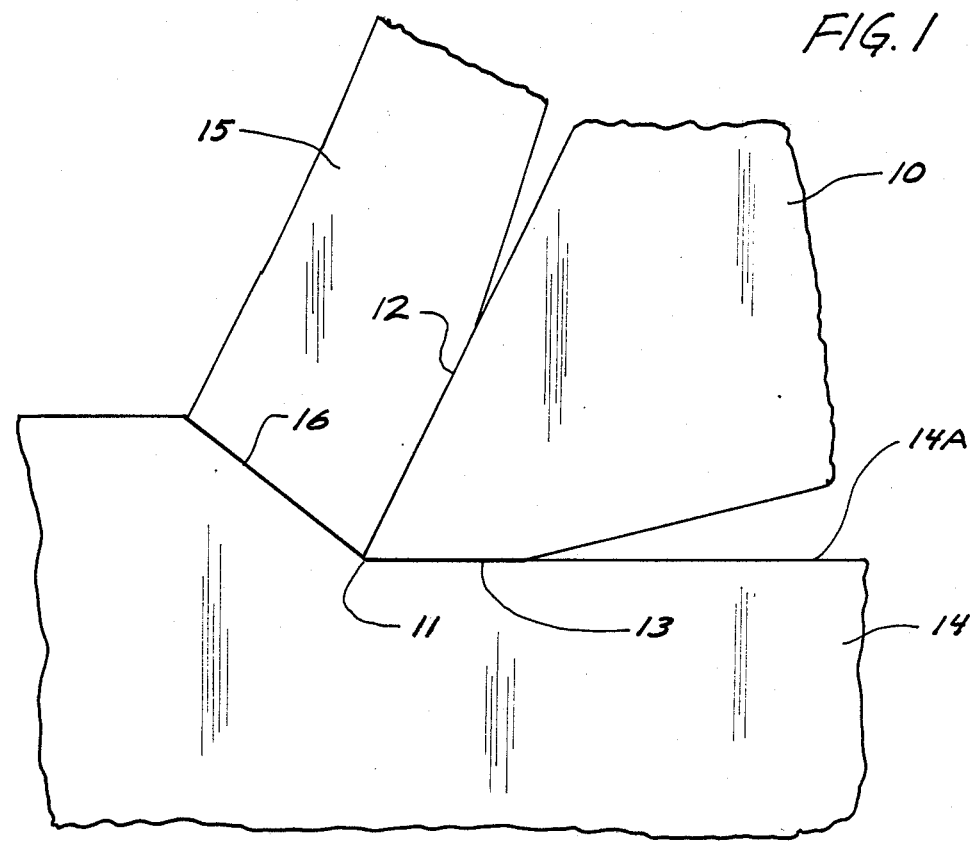
FIG. 1 is a part schematic representation of a worn cutting tool engaging a work piece and showing a chip being formed.

In FIG. 1, a schematic representation of a tool being used in a machining operation is shown. The cutting tool or insert indicated at 10 generally has a sharpened edge 11, with a tool face surface 12 and a tool flank face 13 adjacent the cutting edge 11. The flank face 13 shows the condition of a worn tool. The work piece 14 is engaged by the cutting edge 11. A chip indicated at 15 is removed from the workpiece as the tool moves below the surface of the work piece 14. The chip 15 separates along a shear surface shown at 16, and is discarded. As the tool wears the power necessary for moving the tool relative to the work piece is changed, the smoothness of the machined surface 14A changes, and the vibrations and similar phenomena which occur at the tool cutting edge 11 indicate the status of the tool condition. Chip segmentation causes vibration, and any vibration of the tool 10 is communicated as waviness in the surface finish on the surface 14A. However, under most operating systems the tool edge vibrations are of high frequency that are filtered out by the interface between the tool and the clamp holding the tool in place.

Conventionally, the cutting tool 10 is clamped onto a tool holder or tool post, and usually it is held on at least two lateral sides in a recess and clamped down on its bottom surface. The tools or cutting inserts are generally square, and can have one or more cutting edges formed thereon. The type of cutting edge being used depends on the material of the work piece, the surface finish required on the work piece and other factors.

Figure 2:
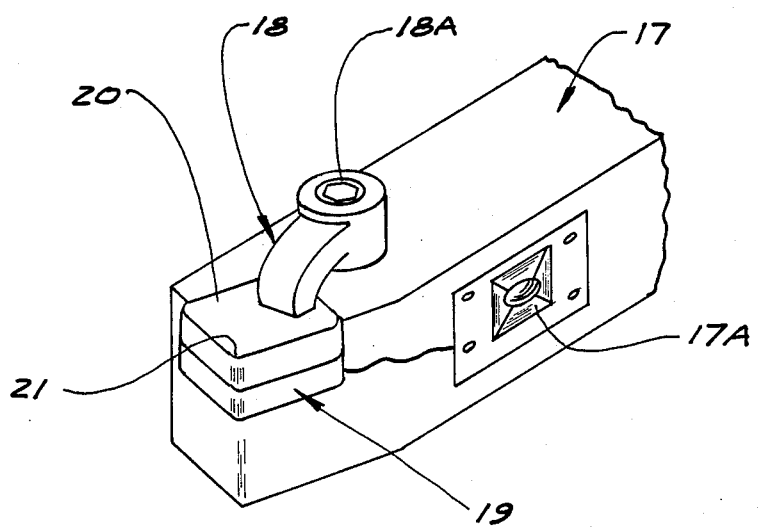
FIG. 2 is a perspective view of a cutting tool made according to the present invention having instrumentation installed directly thereon.
Figure 3:
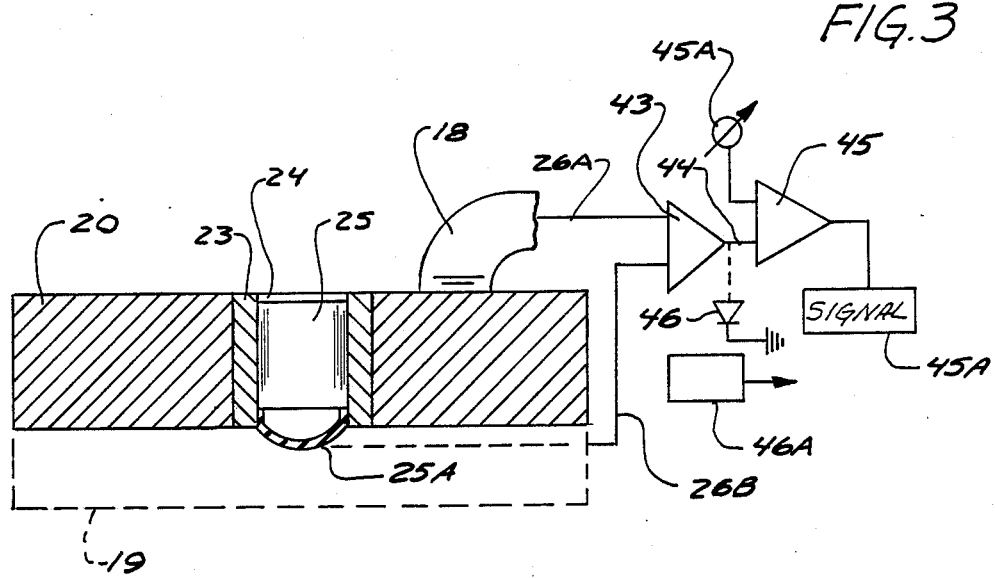
FIG. 3 is a cross-sectional view of a cutting tool shown in FIG. 2 with a first type of sensor, used therewith.

Referring now to FIGS. 2 and 3, a cutting tool or insert made according to a first form of the cutting insert of the present invention is illustrated at 20 and comprises a block of suitable material held onto a tool holder 17 with a clamp finger 18 that is held with a screw 18A and held against a support block 19 that interfaces with a seat surface on the tool holder 17. The cutting insert or tool 20 can be coated, if desired. A corner 21 of the insert is shown formed for cutting. It can be undercut as desired and generally conforms to the configuration shown of the typical tool 10 in FIG. 1. The cutting insert 20 has a bore 22 (FIG. 3) formed therein in the center, and a piezo-electric material sleeve indicated at 23 is bonded to the interior surface of the bore 22. The sleeve 23 is fastened with any suitable bonding technique for retaining piezo-electric material in place. Preferably, the bonding material will be conductive to form an electrical contact to the outer surface of the sleeve.

The interior bore 24 of the sleeve 23 has contact with the inner surface of the sleeve of piezo-electric material. A spring contact 25A forming a type of bellows is used as an electrical contact. The contact 25A will make contact with the support block 19, which can be suitably insulated from the tool holder and a lead can be affixed to block 19 for carrying signals. A light spring contact may be used for engaging to mass, or a flexible lead connected to the mass can be used.

The mass 25 and the piezo-electric sleeve together form an accelerometer. The mass 25 loads the sleeve to cause voltage changes between the outer surface and inner surface of the sleeve which voltage changes can be sensed by leads 26A and 26B from holder 17 and the contact 25A. Vibrations of the cutting insert 20 are picked up by the mass and this causes a voltage to be generated in the preferably radially poled piezo-electric material sleeve 23 between the inner and outer surfaces as shear is applied to the sleeve. The vibrations affecting the cutting insert are sensed so that an output voltage is generated proportional to the shear in the sleeve. As will be explained, if the cutting insert 20 fractures, the vibration amplitude and thus the output voltage amplitude increase markedly and early fractures can be detected and the signals used for an alarm.

Figure 4:
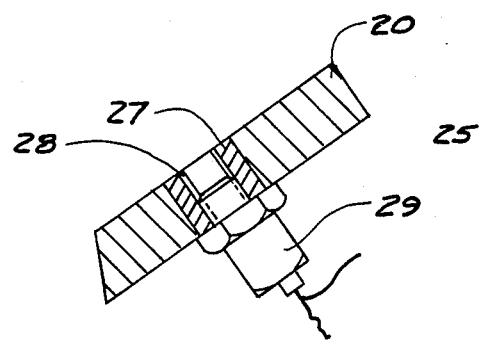
FIG. 4 is a further modified form of acceleration sensor used with a tool insert made according to the present invention.

In FIG. 4, a modified form of the invention is shown. A sleeve 27 is bonded to the interior surface of the bore 22 of the cutting insert or tool 20. This sleeve 27 can be made of any suitable material. It may be brazed, or laser or electron beam welded into place if the cutting tool is made of high speed steel or carbide material. In ceramic cutting tools or inserts, silicon coated stainless steel sleeves may be used. Sleeves of zirconium or titanium may be used with silicon nitride and SIALON-type ceramic cutting inserts. If an alumina cutting insert or tool is used, a sleeve of a metal alloy sold under the trademark KOVAR is suitable.

The interior bore 28 of the sleeve 27 has an internal thread and a high band width accelerometer indicated at 29 is threaded tightly into the metal insert. The accelerometer is thus positioned on the central axis of the cutting insert 20 and is in direct, tight physical contact with the insert. This means that any internal vibrations of the insert are picked up by the accelerometer 29. External vibrations affecting the insert are also sensed so that any vibration or movement of the cutting insert transmitted to the accelerometer 29.

The accelerometer 29 is connected to suitable circuitry that can be used for interpreting the vibrations encountered by the accelerometer to control feed rates, control changing of cutting inserts or tools, and also to provide information relating to insert breakage, cracks or chipping. Circuits which provide an output as a function of frequency of vibration are suitable.

Figure 5:
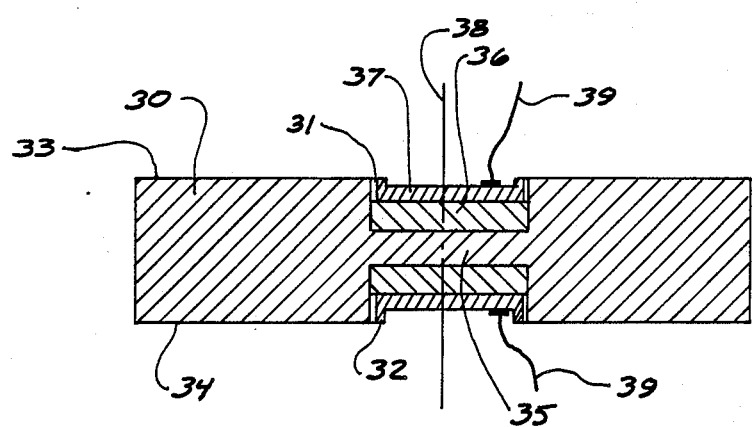
FIG. 5 is a sectional view of a type of acceleration sensor used with a cutting tool made according to the present invention.

FIG. 5 illustrates a further modified form of the cutting insert and sensor of the present invention. This cutting insert indicated generally at 30 is made of a suitable material such as a tool steel or ceramic, if desired. In this form of the invention, the cutting tool has a pair of oppositely facing blind bores or recesses 31 and 32, respectively, that are on the central axis and extend inwardly from the opposite faces of the tool. The faces are indicated at 33 and 34, respectively.

A center bar of material 35 separates the bores, and the center bar 35 has oppositely facing surfaces forming the bottoms of bores 31 and 32 against which separate piezo-electric sensors 36 are supported. These piezo-electric sensors 36 are acceleration sensors and have inertial masses 37 on the outer side of each of the pieces of piezo-electric material forming the sensors.

The inertial masses 37 each comprise a metal material that is bonded to and forms an electric contact with the respective piezo-electric sensor. Suitable contacts and leads 39 can be provided on the outer surfaces of the masses 37.

Because the respective mass 37 is generally bonded directly to its associated piezo-electric sensor 36 and is not fastened to the surfaces of the bore in the cutting insert, the mass moves to load the respective sensor under vibration in direction along axis 38. The piezo-electric material sensors 36 (preferably a piezeo-ceramic material), are bonded to the surfaces of the bore in the cutting insert 30. The side surfaces of the sensors usually are coated with metal to provide an electrical connection to the cutting insert. The interface between the cutting insert and the piezo-electric material forms a ground connection. Since sensing frequency is generally sufficient for indicating the conditions that are of interest in the cutting tool, the measurement of a voltage drop generated when a suitable resistor is connected across the sensing surfaces of the piezo-electric sensors will provide the needed information. Appropriate charge amplifiers offer another means of securing the needed information.

A circuit for indicating fracture of an insert can be quite simple, as shown in FIG. 3 in block diagram. The voltage signal from the accelerometer formed by piezo-electric sleeve 23 or of the types shown in FIGS. 4 and 5 is represented on leads 26A and 26B. The output signal is a voltage signal as shown, and is amplified through an amplifier 43 of suitable design. The signal on line 44, which is the output of the amplifier 43, is preferably provided to a comparator 45 which comprises the voltage from amplifier 43 with a reference 45A set to a level such that under normal operation, the comparator will not provide an output, but when a fracture starts, the accelerometer output will increase sharply, as illustrated in FIG. 6, and when the voltage on line 44 exceeds a reference level, the comparator provides an output that is used to sound an alarm or otherwise give an indication through a signal circuit 45A.

Alternatively, and in particular when the tool insert and sensor is used on a rotating tool holder or head, the output voltage from the piezo-electric material sensor 23 or other acceleration sensor can be used for lighting an LED 46 (FIG. 3). The LED 46 can be directly connected to the leads from the piezo-electric sensor if sufficient voltages are generated by the piezo-electric material, or an amplifier 43 can be used. A photo-sensitive transistor 46A is used for detecting a light level from LED 46 to provide an output for signaling a problem or for recording performance. The LED 46 and its associated circuit can be mounted on a rotating tool holder while the receiver-sensor 46A can be mounted on the machine tool frame for optically coupling the signals from the sensor on the insert to output circuitry. The circuitry can be housed in a receptacle or chamber found in the tool holder, as shown at 17A in FIG. 2. A removable cover is used to cover the chamber.

Figure 6:
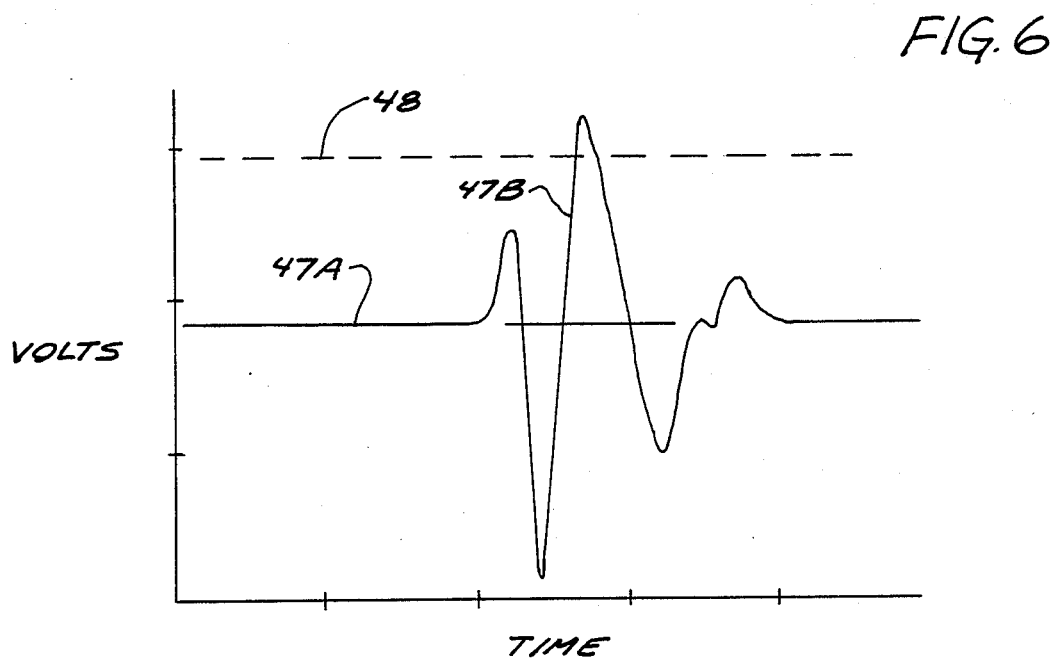
FIG. 6 is a plot of a typical response received from cutting inserts having sensors according to the present invention thereon when the cutting insert is fractured.

FIG. 6 represents a typical plot of the output from the piezo-electric sensor 23 or other similar sensor on a tool insert. FIG. 6 shows voltage on a vertical scale (y axis) versus time on the horizontal scale or x axis after suitable electronic filtering to remove unwanted frequencies. Normal vibrations provide a generally constant output voltage shown at line segment 47A. A fracture will cause a change in output amplitude as shown at line segment 47B. If the peak amplitude exceeds the reference level 48, at the comparator 45 for a predetermined time, the comparator 45 will provide an output to provide the signal for an alarm.

The cutting inserts or tools are designed to meet existing United States and ISO standards, so field calibration of the normal vibration level and alarm level of the output is unlikely to be needed. Off-line determination of the sensor output of the cutting inserts by the manufacturer after the accelerometers or sensors have been put into place will be sufficiently accurate for field operation. Circuits capable of automatic lead setting may also be used to accomodate changing operating conditions.

Titanate and zirconate materials, or other materials such as quartz with high Curie points are among appropriate sensor materials usable for the construction of the accelerometer structure shown in FIGS. 3 and 5. By heating and slowly cooling such piezeoceramic or piezo-electric structures within a strong electric field as the cooling phase passes the ferroelectric point, piezo-sensitivity can be assured. Accidentally overheated cutting inserts or tools may also be recovered by performing the same steps of heating and slowly cooling. Cutting inserts with acceleration sensors may require cooling during use either by convective or conductive means, and cooling passages can be built into the tool holder, if desired. The cutting inserts can be made in relatively simple processes, and the individual sensors can also be made in batch processes and coated appropriately. The mass 25 or 37 that is added to each of the piezo-electric sensors 23 or 36 can be selected to provide a desired sensitivity.

Figure 7:
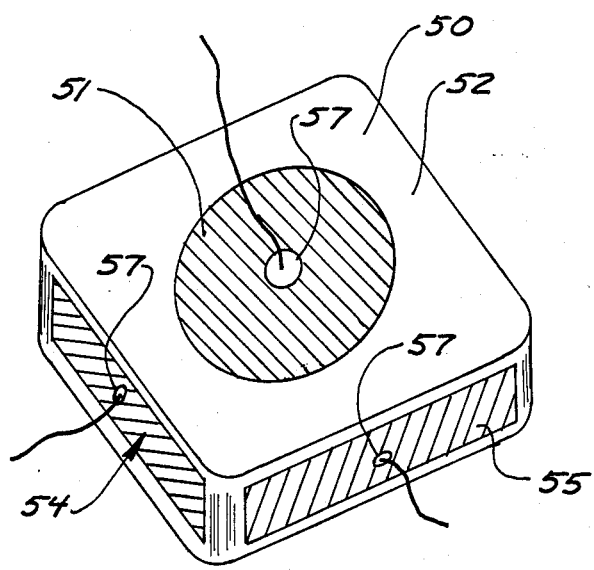
FIG. 7 is a perspective view of a cutting tool having piezo-electric or piezo-resistive materials deposited thereon for use in sensing vibrations and forces.
Figure 8:
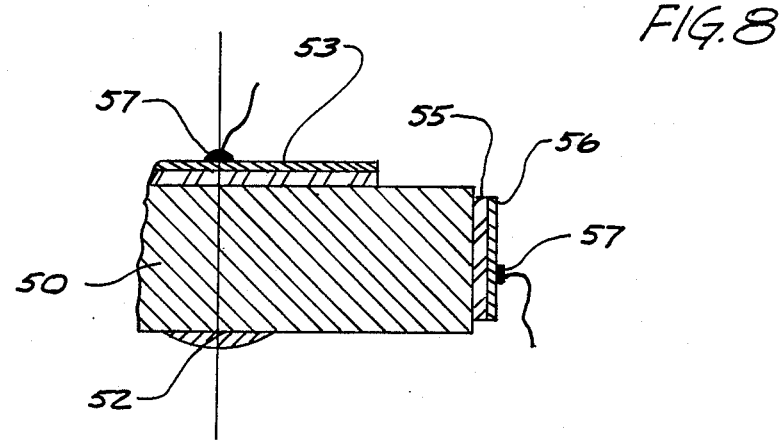
FIG. 8 is a fragmentary enlarged sectional view through the center of FIG. 5 showing deposited layers of piezo-electric or piezo-resistive material.

Suitable force sensors can be constructed as shown in FIGS. 7 and 8, and in this case, the cutting insert or tool 50 is made in a suitable configuration as shown, and can have a cutting edge or cover sharpened as desired. In this instance, the cutting insert body itself is provided with integral force sensing (piezo-electric or piezo-resistive) materials. For example, an axially centered, circular, film of piezo-electric material indicated at 51 can be provided on opposite major side surfaces 52 of the cutting insert 50, and the piezo-electric material preferably can be from less than 1 up to 500 micrometers in thickness and can be deposited on an interlayer of copper or nickel, if there is a carbide deposition on the surface of the cutting insert, to assure that there will be electrical contact to the sensor 51. The cutting tool itself will then serve as a ground electrode, and electrical contacts can be attached to a suitable outer layer indicated schematically at 53 in FIG. 8. One or more of the lateral sides of the insert 50 can also be used for depositing of a piezo-electric material. For example, a sensor 54 can be provided on at least one of the peripheral side surfaces of the insert or tool 50, and a sensor 55 can be provided on the side that is adjacent to and at right angles to the sensor 54. These also have a suitable overlay 56 (about 0.2 to 0.5 micrometers thick) so that electrical contacts 57 can be attached, and with the cutting insert 50 providing the ground connection, an electrical excitation signal can be applied across the sensor layers. A piezo-resistive material can be connected into a conventional bridge circuit for sensing resistance changes under load.

Also, if desired, contacts built into the tool holder can serve as electrodes. The piezo-electric or piezo-resistive voltages generated in the force sensors shown at FIGS. 7 and 8, or the output signals from a piezo-resistive bridge can be amplified and signal processed with suitable circuitry to correlate the signal magnitudes to force on the cutting insert.

The forces acting directly on the cutting insert sensed with the device of FIGS. 7 and 8 can be used for determining or monitoring tool wear or to detect impending breakage. The vibrations of the tool change as the tool wears and the frequency of vibration can be sensed with a frequency sensing circuit for analysis. Redundant applications can be provided so that if desired, both acceleration and force signals can be used, but usually one or the other will work.

For commercial applications, use of a low cost piezo-electric material is preferred. Radio frequency sputtered zinc oxide deposited in the presence of excess oxygen is an inexpensive solution to depositing piezo-electric layers, such as those shown in FIGS. 7 and 8. Such radio frequency sputtering provides atomic level bonding of the deposited film to the underlying surface, as is well known in the art. Again, carbide cutting inserts or tools are generally coated, and where they are used, an interlayer deposit of copper or other conductive materials may be needed before depositing the piezo-electric sensing layers.

Figure 9:
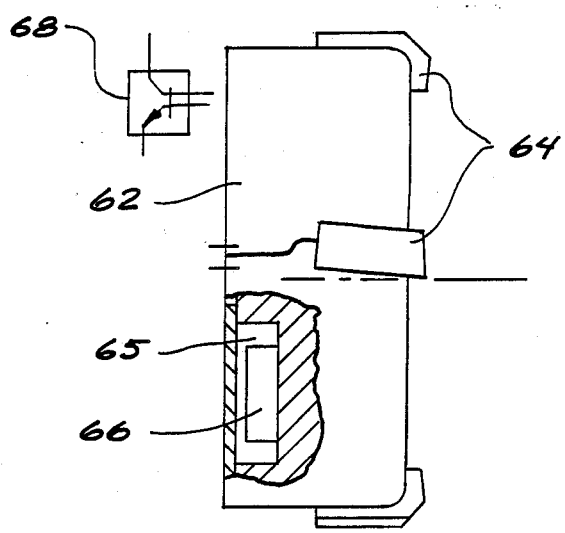
FIG. 9 is a side view of a rotating tool head having tool inserts made according to the present invention installed thereon.

FIG. 9 shows a typical application of cutting inserts having sensors such as those shown in FIGS. 3, or 7 and 8 on a rotating cutter head 62. The cutting inserts 64 are held in place in a suitable manner, and the cutter head 62 has a receptacle 65 with a removable cover for mounting sensing circuitry 66 coupled to the sensor on each of the inserts 64. The power supply for the circuit also can be contained in the receptacle 65. Suitable leads are provided to provide connection to the sensor. If light emitting diodes are used, a sensor 68 may be mounted adjacent the head for sensing light output that would indicate fracture, wear or other sensed conditions on the cutting insert.

The cutting inserts or tools disclosed herein provide direct information indicating frequency of vibrations or forces applied to the cutting inserts, and give a very high speed response to various cutting phenomenon acting on the cutting insert. The sensors and tools can be pre-built, and do not require precision insertion and clamping of delicate contact plates. Further, there is no filtering by mechanical interfaces between the cutting insert and its supporting structure.

Acoustic emission signals may be sensed in the range of 100 kHZ to 300 kHZ with high sensitivity piezo-electric materials.

The geometry or outer shape of the cutting tools utilizing the sensors of the present invention can be varied, from that shown, in order for different configurations of machines.

Although the present invention has been described with reference to preferred embodiments, workers skilled in the art will recognize that changes may be made in form and detail without departing from the spirit and scope of the invention.

What is claimed is:

1. A cutting insert for machining materials having a cutting edge, said cutting insert comprising a solid body, and a sensor integrally coupled directly to and carried by the insert to sense parameters at the cutting edge which are functions of the cutting phenomena acting on the insert, the sensor having means for providing output signals from the sensor generated by mechanical forces acting on the cutting insert, the sensor comprising a deposited thin film of piezo-electric material coupled to a cutting insert surface and spaced from an edge of such insert which contacts a workpiece, the piezo-electric layer having atomic level bonding with respect to the surface of the insert.

2. A cutting insert for machining materials having a cutting edge, said cutting insert comprising a solid body, and a sensor integrally coupled directly to and carried by the insert to sense parameters at the cutting edge which are functions of the cutting phenomena acting on the insert, said sensor comprising a ring of piezo-electric material having an outer surface fixed to surface portions of the cutting insert and positioned in an internal opening defined in the cutting insert, the ring having surface portions defining an open center, a mass fixed to the surface portions of the ring defining said open center, and means for providing output signals generated by mechanical forces acting on the cutting insert comprising electrical lead means coupled to spaced portions of the piezo-electric material of the ring for sensing voltage outputs.

3. The cutting insert of claim 2, and circuit means coupled to the lead means, including a comparator providing a comparator output when the voltage outputs of the lead means exceed a reference level for a preselected time.

4. A cutting insert for machining materials having a cutting edge, said cutting insert comprising a solid body having planar side surfaces and a central axis perpendicular to such side surfaces and having a bore therein defined by a bore surface, an accelerometer integrally coupled directly to and carried by the insert to sense parameters at the cutting edge which are functions of the cutting phenomena acting on the insert, the accelerometer comprising a piezoelectric material mounted in said bore and integrally bonded to the bore surface, means forming a mass on a surface of said piezoelectric material to cause changes in voltage characteristics in said piezoelectric material upon accelerations in direction perpendicular to the side surface of the cutting insert, and means for providing output voltage signals from the accelerometer.

5. A cutting insert for machining materials comprising a solid body having a pair of generally parallel major side surfaces defining a thickness, and a peripheral edge around the cutting insert, layer means of piezo-sensitive material deposited on at least one surface of the cutting insert and each layer means being formed as a thin film layer having atomic level bonding to the cutting insert surface for electrical contact therewith, said layer means of piezo-sensitive material having an exposed surface, and means on the exposed surface for applying a second electrical contact thereto, said layer means of piezo-sensitive material comprising an integral sensor atomically bonded to the respective surfaces and carried by the cutting insert and providing an electrical output from the piezo-sensitive material between the insert and the second electrical contact in response to forces and stresses acting on the cutting insert when the cutting insert is held in a working position and used for machining materials.

6. The cutting insert of claim 5 wherein one surface on which the piezo-sensitive material is deposited comprises one of the major side surfaces of the cutting insert.

7. The cutting insert of claim 5 wherein the piezo-sensitive material comprises a piezo-ceramic material.

8. The cutting insert of claim 5 and a tool carrier, means for mounting the cutting insert on the tool carrier, and means defined in the tool carrier for carrying circuit means for connection to the piezo-sensitive material.

9. The cutting insert of claim 5 wherein said piezo-sensitive material comprises piezo-resistive material.

10. The cutting insert of claim 5 wherein the piezo-sensitive material comprises piezo-electric material.

* * * * *